Aug. 29, 1961 T. N. CROOK 2,998,593
APPARATUS FOR INTERPRETING GEOPHYSICAL DATA
Filed April 3, 1958 2 Sheets-Sheet 1

INVENTOR.
TROY N. CROOK,
BY
ATTORNEY.

Aug. 29, 1961  T. N. CROOK  2,998,593
APPARATUS FOR INTERPRETING GEOPHYSICAL DATA
Filed April 3, 1958  2 Sheets-Sheet 2
FIG. 3.
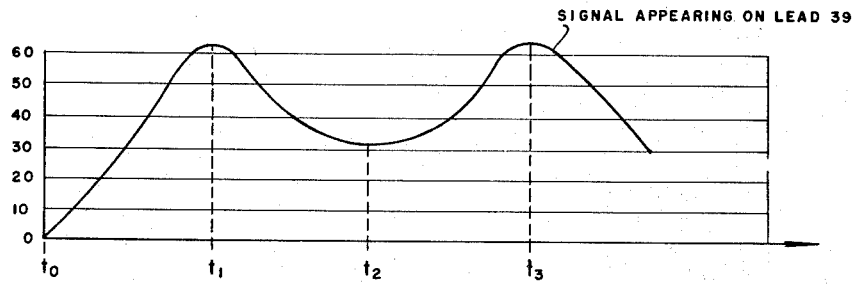
FIG. 4.
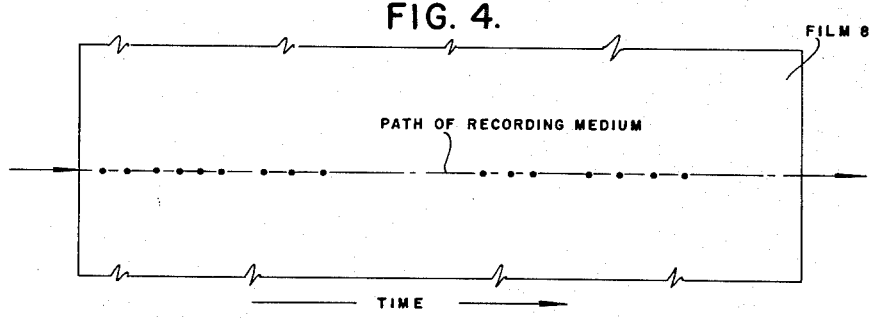
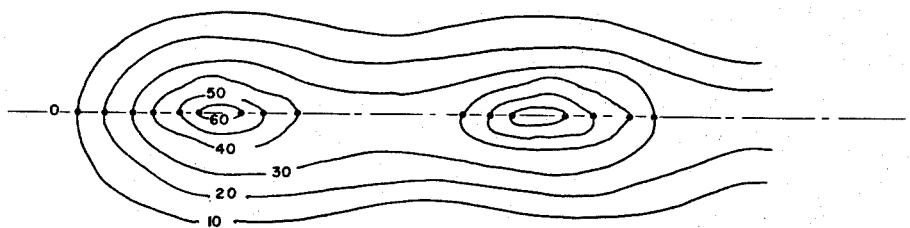
FIG. 5.
INVENTOR.
TROY N. CROOK,
BY *John B. Davidson*
ATTORNEY.

United States Patent Office 2,998,593
Patented Aug. 29, 1961

2,998,593
APPARATUS FOR INTERPRETING GEOPHYSICAL DATA
Troy N. Crook, Bellaire, Tex., assignor, by mesne assignments, to Jersey Production Research Company, Tulsa, Okla., a corporation of Delaware
Filed Apr. 3, 1958, Ser. No. 726,093
6 Claims. (Cl. 340—15)

This invention relates to the interpretation of geophysical data, and more particularly to the visual presentation of correlation signals derivable from the seismogram.

In prospecting for subterranean deposits of minerals, gas, and petroleum, it is known to use seismic reflection techniques wherein seismic impulses are initiated at or in the vicinity of the surface of the earth to generate an elastic wave of seismic frequency which is transmitted down through the earth. When the wave encounters a discontinuity in the earth structure, at least a portion of the energy in the wave will be reflected or refracted and returned toward the surface of the earth. One or more seismic detectors positioned at the earth's surface are used to generate electrical signals responsive to the reception of the returning wave energy. Each seismic detector generally receives a number of reflected waves varying both in magnitude and time in accordance with the depth of discontinuities in the earth's structure. The output of each seismic detector in a seismic observation is a substantially sinusoidal electrical signal varying in amplitude with time, with prominent variations in the amplitude of the signal corresponding to the arrival of reflected and refracted waves. A seismogram (a record of a plurality of seismic wave detector output signals) can yield much information relating to subsurface discontinuities, such as the depth, strike and dip of the discontinuities.

To improve the speed and accuracy of seismogram analysis, it has been found desirable to use apparatus such as is described in the co-pending application of Frank J. Feagin et al., "Method and Apparatus for Interpreting Geophysical Data," Serial No. 382,588, filed September 28, 1953. In this particular patent application, there is described apparatus for use in connection with geophysical prospecting wherein intervals of a seismic record are selected for correlation, the portions selected being those that appear to contain coherent components of the seismic signal. In order to determine the time relationship between coherent components of the seismic signals over an interval of the signals, the signals are correlated in accordance with a selected criterion for best fit therebetween over the entirety of the selected interval. Determination of best fit involves successive shifting of the time relationship between said traces and correlation of the seismic traces over the selected interval for each time relationship. An electrical output signal from the correlation apparatus indicates the degree of correlation; an extreme indication of a meter measuring the electrical signal indicates the time relationship between the seismic traces corresponding to maximum correlation therebetween. In order to determine the optimum time relationship between coherent components in a selected interval of the seismic record, it is necessary to limit the interval to a relatively small segment of the record. The reason for this is that the seismic record considered in its entirety may contain coherent components having more than one optimum time relationship in different sections of the record. In other words, since coherent components of the seismic traces have different time relationships over different intervals of the seismograms, the interval of correlation mentioned above of necessity must be chosen to be over only a very small part of the total seismic record. The problem remains of determining the optimum time relationship between the various coherent components in an effective manner for various or even overlapping intervals of the seismic record and presenting the correlation information obtained thereby in a visually effective form.

In accordance with the teachings of the present invention, this may be done by carrying out the correlation process over an interval which is scanned or varied along the entire length of the seismic record. The scanning is carried out for each of a multiplicity of time relationships between the seismic traces. Each scanning process results in a correlation signal for the entire seismic record that will be indicative of the degree of correlation for various sections of the seismic record for a particular time relationship between traces. Each correlation signal is quantized so as to produce an output indication only when the amplitude of correlation signal is of one of a plurality of amplitudes corresponding to given, predetermined units of correlation. The output indications for a particular correlation signal are recorded as a plurality of dots or short lines disposed along a straight line, each dot or short line indicating the instant at which the correlation signal is of one of the plurality of preselected amplitudes (the preselected amplitudes corresponding to given units of correlations). Output indications for the various correlation signals are recorded on a common time scale in side-by-side relationship. The various correlation signals are recorded in a given order determined by the magnitude of the time relationship between seismic traces with which the signals were obtained. The dots and short lines will combine to form a plurality of more or less complete loops generally resembling a contour map, each loop corresponding to a particular degree of correlation. On the final recording, one axis will correspond to time on the seismogram, and the other will represent time shift between seismogram traces. By determining the approximate points about which the correlation loops appear to center, one can readily determine the time shifts with which maximum correlation can be obtained at various times on the seismogram.

A more complete understanding of the invention may be had from the following description thereof when considered in connection with the accompanying drawings, wherein:

FIG. 3 is a waveform representation of an electrical correlation signal obtainable from the apparatus of FIG. 1;

FIG. 4 is a recording which would be obtained from the correlation signal of FIG. 3 utilizing the apparatus of FIG. 1; and FIG. 5 is a typical recording obtainable from the apparatus of FIG. 1 with a multiplicity of time shifts between traces of a seismogram under analysis.

Figure 1:
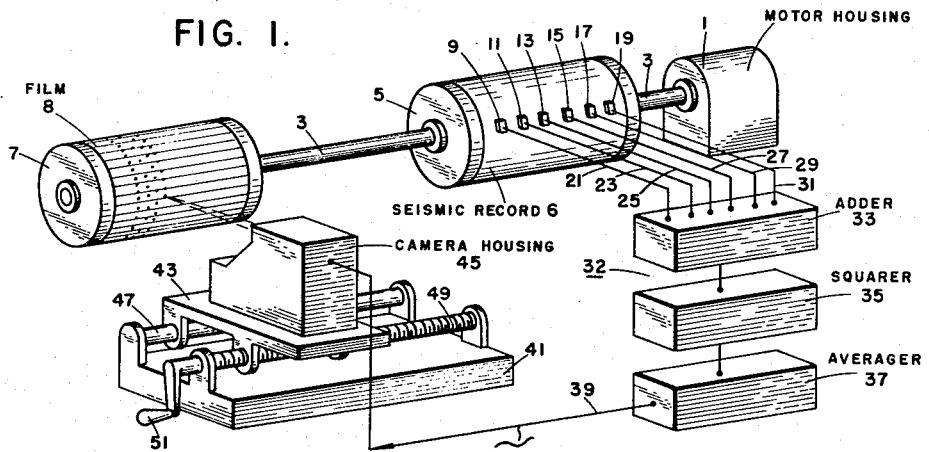
FIG. 1 is a schematic representation of apparatus suitable for use in connection with the practice of the present invention.

With reference now to the apparatus shown in FIG. 1, there is illustrated a suitable means for carrying out the present invention. An electric motor within the housing 1 drives two drums 5 and 7 on a common shaft 3. On drum 5 is mounted a magnetic tape 6 or other suitable storage device upon which a seismogram has been recorded. Drum 7 carries an unexposed photographic film 8.

A plurality of magnetic pickups or heads 9, 11, 13, 15, 17, and 19 are mounted so as to be circumferentially movable around the exterior of drum 5. The function of the magnetic pickups is to reproduce the geophone output signals previously recorded on tape 6 in the usual manner. Methods and apparatus for recording geophone output signals on magnetic tape are well known to the art. Magnetic pickups 9, 11, 13, 15, 17, and 19 are circumferentially movable about drum 5 so that the time relationship between the output signals of the pickup may be varied. In other words, as drum 5 revolves, the time shift between the reproduced seismic signals may be varied by adjusting the relative positions of the magnetic pickups around drum 5. Magnetic reproducing heads 9, 11, 13, 15, 17, and 19 are coupled to an adding circuit 33 of an electronic seismic correlating device 32. The correlating device may comprise adding circuit 33, squaring circuit 35, and averaging circuit 37. Leads 21 through 31 respectively couple magnetic heads 9, 11, 13, 15, 17, and 19 to the adding device. The seismic correlator may be of the type described in Frank J. Feagin et al. patent application, Serial No. 382,588, now Patent No. 2,927,656. The output signal from the averaging circuit is conducted by lead 39 to the actuating coil (not shown) of a mirror galvanometer 59 (see FIG. 2).

The mirror galvanometer is mounted in a housing 45 along with associated apparatus shown in FIG. 2 and described below. Camera housing 45 is mounted on a support means 43 which is movable parallel to the axis of shaft 3 by means of a threaded shaft 49 rotatable by means of crank 51. Threaded drive shaft 49 and guide shaft 47, both of which support the support means 43, are mounted on a table 41 to provide firm, stable support for the housing 45.

The apparatus within housing 45 is in many respects similar to the apparatus described in co-pending patent application Serial No. 612,008, filed September 28, 1956, by Carl C. Palmer et al. for "Automatic Plotter," now Patent No. 2,895,236. Referring to FIG. 2, the apparatus is seen to include a lamp 83 energized by a suitable source of electric current. Light from the lamp is focused on a rectangular plate 65 by lens 81. The reflecting mirror 59 of a mirror galvanometer is positioned so as to reflect light shining through a plurality of slits or openings 69, 71, 73, 75, 77, and 79 in the plate 65. The width of the slits should be small relative to the spacing therebetween. The actuating coil (not shown) of the galvanometer is energized from lead 39. The mirror 59 is suspended by wires 61 and 63. A channel plate 55 with a single slit 57 is positioned to intercept the reflected images of slits 69 through 79. Lens 53 focuses light passing through slit 57 on photographic film 8 carried by drum 7. As the mirror 59 rotates on its axis in a counterclockwise direction as indicated by arrow 60, light reflections 79a, 77a, 75a, 73a, 71a, and 69a will successively pass slit 57. In the position of the mirror shown in the drawing, no reflections are passing through slit 57. The light from the slits in plate 65 that passes through slit 57 after being reflected by mirror 59 will be focused on photographic film 8 by lens 53. The quantity of light passing through slit 57 will be proportional to the area of the slit reflected from mirror 59, the image of which is directed through slit 57. Therefore, the density of the recording on photographic film 8 will be proportional to the area of the reflected slit directed on the photographic film by lens 53.

Suitable light shields should be provided between the components of the system described above so that mirror 59 will reflect only light passing through the slits of plate 65, and so that the only light that can strike film 8 will be the light that passes through slit 57.

Figure 2:
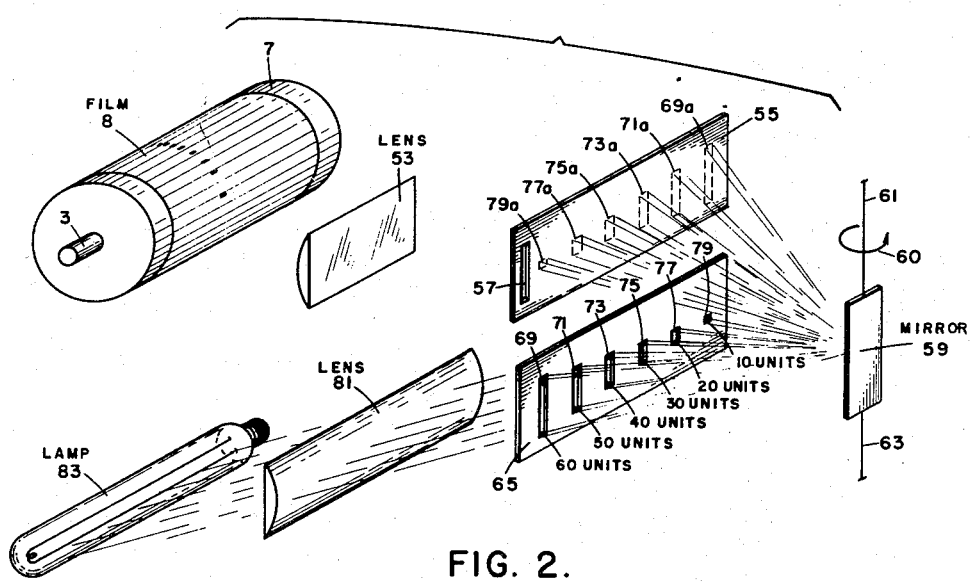
FIG. 2 is a more detailed showing of a portion of the apparatus depicted in FIG. 1.

If mirror 59 is positioned as shown in FIG. 2 when no current is flowing through the actuating coil of the mirror galvanometer, no light will pass through slit 57 to strike photographic film 8. As the current from averaging circuit 37 increases in magnitude, the galvanometer will deflect mirror 59 so that light reflections 79a, 77a, 75a, 73a, 71a, and 69a will pass successively through slit 57. Therefore, the particular reflection passing through slit 57 will be a function of the magnitude of current flowing through the galvanometer.

Let it be assumed that a previously obtained seismogram has been recorded on magnetic tape 6 and that the magnetic heads 9 through 19 are positioned relative to each other so that there is no time shift between the reproduced seismic traces. These signals will appear on leads 21 through 31 and it will be added together by adding circuit 33. Amplitude variations in the composite signal will be emphasized by squaring circuit 35 and the resultant signal will be averaged by averaging circuit 37.

FIG. 3 shows the waveform of a signal that may appear on lead 39 as a result of the analysis of a seismogram. The amplitude of the signal gradually rises until it reaches a maximum at time $t_1$, corresponding to a correlation between seismic traces of about 60 percent. The amplitude of the correlation signal then decreases until it reaches a minimum at time $t_2$, corresponding to a correlation of about 32 percent. The amplitude again increases until at time $t_3$ an amplitude is reached corresponding to a correlation between seismic traces of about 64 percent, and thereafter falls until at the end of the seismic record a correlation of about 30 percent is indicated by the amplitude of the correlation signal.

Assume that the deflection of mirror 59 brought about by the electric signal on lead 39 is such that light reflections 79a, 77a, 75a, 73a, 71a, and 69a will pass through slit 57 when the amplitude of the signal on lead 39 corresponds to six different degrees of correlation between the maximum possible correlation and zero correlation, (for example, when the amplitude of the signal corresponds to 10, 20, 30, 40, 50, or 60 arbitrarily selected units of correlation). As the amplitude of the correlation signal progressively increases, mirror 59 will pivot counterclockwise so that successively larger areas of light will pass through slit 57. These areas of light will impinge upon photographic film 8. The magnetic tape 6 and photographic film 8 are being rotated together by the electric motor; therefore, the film will be continuously moving past the spot at which the light is focused. When the film is developed, marks will appear on the film that correspond to the predetermined degrees of correlation represented by the amplitude of the correlation signal at various times on the seismogram. The marks corresponding to given degrees of correlation may be readily identified by the density of the marks on the film. Note that FIGS. 3 and 4 have the same time scale. The marks on the photographic film will be made only when the amplitude of the correlation signal is one of the predetermined amplitudes corresponding to predetermined degrees of correlation. Should the amplitude of the correlation signal remain for a substantial period of time at one of the predetermined amplitudes at which light would shine through slit 57, then a prolonged line rather than a spot or dot will appear on the photographic film when it is developed.

If the signal from head 9 is chosen as a reference and if the heads are in line directly across the drum, the signals produced by the other heads will not be shifted in time since they will be reproduced with the same time relationship with which they were recorded. By staggering the heads around the drum, the reproduced signal from head 9 will lead or lag the other signals, depending on the direction of rotation of the drum and the direction in which the heads were staggered. Assume that the heads are staggered around the drum so that the distances from head 9 of successive heads 11, 13, 15, 17, and 19 are successive integrals of a given distance. (For example, if the distance between heads 9 and 11 is the given distance, the distance between heads 9 and 13 is twice the given distance, etc.) In this case, uniform time shifts will be produced between the signals from adjacent heads.

Initially, the pickup heads will be staggered around the drum 5 so as to produce an extreme time shift between the reproduced signals appearing on adjacent pairs of leads 21 through 31. The position of housing 45 will be adjusted by crank 51 and threaded shaft 49 so that light will impinge upon photographic film 8 near one edge of the film. Motor 1 is energized and the drums are allowed to revolve through a single revolution so that the correlation signals appearing on lead 39 will be recorded as described above. The heads are successively repositioned to produce smaller time shifts between reproduced signals, and the housing 45 is successively moved to the right after each repositioning of the heads. A recording is made for each position of the heads. The heads may be successively repositioned until the time relationship of the signals reproduced by the various heads is reversed in sense. Thereafter, the heads may be further repositioned in steps until there is another extreme time shift between the reproduced signals, a correlation signal being recorded for each position of the heads.

After the procedure outlined above has been completed and after the photographic film has been developed, it will be found that the various dots and marks produced as described above with respect to FIGS. 3 and 4, will combine to themselves produce lines. These lines will be of the general nature depicted in FIG. 5. The dots and marks produced for each degree of correlation between seismic traces will combine to form a single line or curve. In general, it will be noted that the lines will tend to form closed loops. These loops will appear to have centers, each of which corresponds to either a correlation high or a correlation low. The contour lines surrounding a high will be successively darker toward the center, whereas those surrounding a low will be successively lighter; and thereby, highs and lows can be readily distinguished. In general, the smaller the area enclosed by a set of contour lines, the more pronounced or distinct is the correlation anomaly corresponding to the enclosure. Correlation highs are of more interest than correlation lows. By determining the coordinates of a center corresponding to a high, the time relationship between traces required to produce maximum correlation at the time on the seismogram corresponding to the time coordinate of the center may be readily determined. For example, in FIG. 5, it will be noted that there are two such centers, both of them corresponding to zero time shift between traces. The location of each center stands out very distinctly so that the location of seismic events on the seismogram and the time relationship between coherent elements of the event can be readily determined.

As noted above, the slits in plate 65 are of different areas to facilitate identification of the loops on the correlogram. The slits may have the same area if glass or translucent plastic of different colors are placed over the slits and the film 8 is color-sensitive. The degree of correlation corresponding to a given loop may be determined by the color of the loop.

The invention is not necessarily to be restricted to the specific structural details, arrangement of parts, or circuit connections herein set forth, as various modifications thereof may be effected without departing from the spirit and scope of this invention.

What is claimed is:

1. Apparatus for recording a plurality of successive seismogram correlation signals obtained from a given seismogram, each of said signals representing the variation in degree of correlation between the traces of said seismogram as a function of time for a given time shift between said traces of said seismogram, each correlation signal being obtained with a time shift different from the time shifts with which the other correlation signals were obtained, said apparatus comprising: a light-sensitive medium movable to provide a time scale corresponding to the time scale of said given seismogram under analysis; pivotally mounted reflecting mirror galvanometer means adapted to pivot in response to a correlation signal and adapted to reflect light transmitted from said light source; means positioned between said light source and said reflecting means adapted to transmit a plurality of adjacent areas of light to said reflecting means; channeling means positioned between said reflecting means and said light-sensitive medium adapted to transmit the reflections of said areas of light to said light-sensitive medium singly in accordance with the angular movement of said reflecting mirror galvanometer means, each area of light transmitted to said light-sensitive medium corresponding to a given amplitude of the correlation signal pivoting said reflecting means; and means for coupling successive correlation signals to adjacent light source reflecting means to record said correlation signals on said recording medium in side-by-side relationship according to the same time scale stepwise in the order of time shift corresponding thereto between extremes of time shift.

2. The apparatus of claim 1 wherein each of said areas of light is different in size from the size of the others of said areas of light.

3. The apparatus of claim 1 wherein each of said areas of light is of a different color.

4. Apparatus for recording a plurality of successive seismogram correlation signals obtained from a given seismogram by seismic correlation means, each of said signals representing the variation in degree of correlation between the traces of said seismogram as a function of time for a given time shift between said traces of said seismogram, each correlation signal being obtained with a time shift different from the time shifts with which the other correlation signals were obtained, said apparatus comprising: a drum mounted light-sensitive medium rotatable to provide a time scale corresponding to the time scale of said given seismogram; a plurality of pivotally mounted light reflecting means; galvanometer means associated with each of said light reflecting means adapted to controllably rotate said light reflecting means about the pivot axis thereof as a function of the amplitude of a correlation signal coupled thereto; means coupling said seismic correlator means to said galvanometer means; means positioned between said light source and said reflecting means adapted to transmit a plurality of adjacent areas of light to each of said reflecting means; channeling means between said reflecting means and said light-sensitive medium adapted to transmit reflection of said areas of light to said light-sensitive medium singly in accordance with the angular movement of said light reflecting means, each area of light transmitted to said light-sensitive medium corresponding to a given amplitude of the correlation signal pivoting said reflecting means; and means for coupling successive correlation signals to the galvanometer means of adjacent light reflecting means.

5. Apparatus for analyzing reproducible multi-trace seismograms, comprising: trace reproducing means for reproducing the seismogram traces as electrical signals with an adjustable time shift between the reproduced seismogram traces; correlating means coupled to said trace reproducing means for producing an electrical correlation signal having an amplitude indicative of the correlation between said electrical signals; quantizing means coupled to said correlating means for quantizing said electrical correlation signal to produce an output indication only when said electrical correlation signal is of each of a plurality of discrete, predetermined amplitudes; recording means operatively associated with said quantizing means and said trace reproducing means for rectilinearly recording the output indications of said quantizing means on a time scale proportional to the time scale of the seismogram; and means operatively associated with said recording means for adjusting the record made by said recording means transversely to the direction of recordation so that records corresponding to the various time shifts introduced between the reproduced seismogram traces by said trace reproducing means are placed in side-by-side relationship in the order of magnitude of time shifts corresponding thereto.

6. Apparatus for analyzing reproducible, multitrace seismograms, comprising: trace reproducing means for reproducing the seismogram traces as electrical signals with an adjustable time shift between the reproduced seismogram traces; correlating means coupled to said trace reproducing means for producing an electrical correlation signal having an amplitude indicative of the correlation between said electrical signals; quantizing means coupled to said correlating means for quantizing said electrical correlation signal to produce an output indication only when said electrical correlation signal is of each of a plurality of discrete, predetermined amplitudes, said output indication varying in intensity in accordance with the magnitude of the amplitude of the correlation signal; recording means operatively associated with said quantizing means and said trace reproducing means for rectilinearly recording the output indications of said quantizing means on a time scale that is proportional to the time scale of the seismogram; and means operatively associated with said recording means and said quantizing means for adjusting the record made by said recording means transversely to the direction of recordation so that records corresponding to the various time shifts introduced between the reproduced seismogram traces by said trace reproducing means are placed in side-by-side relationship in the order of magnitude of time shifts corresponding thereto.

References Cited in the file of this patent

UNITED STATES PATENTS

| | | |
|---|---|---|
| 2,258,700 | Doll | Oct. 14, 1941 |
| 2,628,689 | Rieber | Feb. 17, 1953 |
| 2,676,206 | Bennett | Apr. 20, 1954 |
| 2,688,124 | Doty | Aug. 31, 1954 |
| 2,803,515 | Begun | Aug. 20, 1957 |
| 2,840,441 | Owen | June 24, 1958 |
| 2,864,167 | Hall | Dec. 16, 1958 |
| 2,875,017 | Reynolds | Feb. 24, 1959 |
| 2,920,306 | Feagin | Jan. 5, 1960 |